United States Patent
Gilbert, Jr. et al.

(10) Patent No.: US 6,361,590 B1
(45) Date of Patent: Mar. 26, 2002

(54) LOW NOISE AIR CLEANER

(75) Inventors: Duane L. Gilbert, Jr., Hopedale, MA (US); Stephen M. Gatchell, Warwick, RI (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/483,492

(22) Filed: Jan. 14, 2000

(51) Int. Cl.[7] .............................................. B01D 46/02
(52) U.S. Cl. ...................... 96/384; 96/381; 55/385.1; 55/385.2; 55/472; 55/473; 55/DIG. 21
(58) Field of Search ...................... 96/380, 381, 384, 96/388; 95/273; 55/385.1, 385.2, 471, 472, 473, DIG. 21, DIG. 32

(56) References Cited

U.S. PATENT DOCUMENTS

| | | | |
|---|---|---|---|
| 2,061,535 A | * 11/1936 | Davies | 96/381 |
| 2,184,481 A | * 12/1939 | Aubrey | 96/384 |
| 3,284,148 A | * 11/1966 | Ramniceanu | 55/385.1 |
| 3,308,610 A | 3/1967 | Springer et al. | |
| 3,795,092 A | * 3/1974 | Schwartz et al. | 55/473 |
| 3,828,530 A | * 8/1974 | Peters | 55/473 |
| 3,925,043 A | * 12/1975 | Matrone et al. | 96/381 |
| 3,928,008 A | * 12/1975 | Petersen | 55/472 |
| 4,268,285 A | * 5/1981 | Mason | 55/473 |
| 4,560,395 A | 12/1985 | Davis | |
| 4,737,173 A | * 4/1988 | Kudirka et al. | 96/381 |
| 4,790,863 A | 12/1988 | Nobiraki et al. | |
| 4,841,847 A | * 6/1989 | Hirayama | 55/385.2 |
| 5,078,764 A | * 1/1992 | Lutterbach et al. | 55/467 |
| 5,223,005 A | * 6/1993 | Avondoglio | 55/472 |
| 5,435,817 A | 7/1995 | Davis et al. | 55/337 |
| 6,036,757 A | 3/2000 | Gatchell et al. | |

* cited by examiner

Primary Examiner—Duane Smith
Assistant Examiner—Jason M. Greene

(57) ABSTRACT

A portable air cleaner including a housing defining an air inlet, an air outlet, and an air flow path therebetween, a centrifugal blower retained within the air flow path and operable to draw air through the inlet and a filter retained within the housing and disposed to transmit air circulating in the air flow path out of the outlet. Also included is a conveyor surrounding the blower and defining a scroll shaped passage having one end disposed to receive air from the blower and an opposite end disposed to discharge air into the filter, the conveyor being shaped and arranged to obstruct all rectilinear paths between the blower and the opposite end.

17 Claims, 6 Drawing Sheets

LOW NOISE AIR CLEANER

BACKGROUND OF THE INVENTION

This invention relates generally to air purifiers and, more particularly, to a portable room air purifier providing filter use information.

There is an ever increasing need to provide clean air environments both at home and in the work place. Especially in urban areas where pollutant levels are in excess of those recommended for good health, it is necessary to upgrade living and work environments by removing harmful contaminants from the air.

Airborne pollutants contribute to respiratory infections and illnesses and can be especially damaging to individuals with respiratory problems including allergies or from Asthma. Symptoms of high pollutant levels are burning eyes, nose and throat irritations, headaches, dizziness, coughing and sneezing. Individuals are constantly inhaling particles of dust, smoke, pollen, mold spores, acids, bacteria, viruses, animal hair, soot, and harmful chemicals.

In an effort to provide some relief from airborne pollutants, many offices and homes utilize central filtering systems to remove particles from the air. Unfortunately, such centralized systems, which are economically available, do not remove more than approximately 80–85% of the particles in the air and are only effective on particles which are approximately one micron or larger.

The need to have substantially purified air has resulted in the creation of special filter elements which are defined as HEPA filters. HEPA stands for High Efficiency Particulate Air filters which, by federal standard, are filters with a minimum efficiency of 99.9%. The industry defines HEPA filters as those filters which are efficient in removing 99.97% of airborne particles of a size of 0.3 microns or larger.

Although such HEPA filter elements were originally designed for use in ultra clean environments including laboratories, electronic and biological clean rooms, and hospitals and the like, such filters have been used in portable structures which may be utilized in individual room environments. U.S. Pat. Nos. 5,435,817 and 6,036,757 each disclose such a portable room air purifier having a housing in which a filter element is positioned so as to be intermediate an air inlet and an air outlet and wherein a fan is driven by a motor so as to urge air inwardly through the inlet and discharge the air towards the outlet. The portable room air purifier further includes at least one scroll oriented so as to direct air from the fan generally tangentially with respect to the axis of the fan through a scroll discharge opening. A deflector is mounted in spaced relationship with respect to the discharge opening. The deflector tapers inwardly relative to the scroll to thereby define an open passageway through which air is directed as it is exhausted through the air outlet. The disclosed filter structure provides improved uniform filtered air distribution with a relatively compact device. However, one problem associated with prior HEPA air purifiers is the creation of somewhat undesirable noise levels.

The object of this invention, therefore, is to provide an improved air cleaner which produces lower levels of ambient noise.

SUMMARY OF THE INVENTION

The invention is a portable air cleaner including a housing defining an air inlet, an air outlet, and an air flow path therebetween, a centrifugal blower retained within the air flow path and operable to draw air through the inlet and a filter retained within the housing and disposed to transmit air circulating in the air flow path out of the outlet. Also included is a conveyor surrounding the blower and defining a scroll shaped passage having one end disposed to receive air from the blower and an opposite end disposed to discharge air into the filter, the conveyor being shaped and arranged to obstruct all rectilinear paths between the blower and the opposite end. The absence of unobstructed paths between the blower and the opposite end significantly reduces the noise level produced by the air cleaner.

According to one feature of the invention, the filter is a cylindrical filter axially displaced from the blower and the conveyor, an inner wall surface of the filter and the housing defines a chamber communicating with a substantially circular opposite end, and a portion of the air flow path extends between an outer wall surface of the filter and the air outlet. Noise abatement is enhanced further by this structural arrangement.

According to another feature of the invention, the conveyor includes a ramp surface partially defining the passage and arranged to convey air between the one end and opposite ends in a direction having a component axial to the centrifugal blower. These structural features provide cyclonic expansion of air at the outlet to further reduce sound output.

According to still other features of the invention, the filter is mounted above the conveyor and blower, the housing includes a portable shell having top, bottom and side walls, the air inlet is a first annular grillwork defined in a lower portion of the side wall, and the air outlet is a second annular grillwork defined in an upper portion of the side wall. These structural features provide desirable, low noise air flow between the inlet and outlet.

According to an additional feature of the invention, sound reducing material is disposed axially between the blower and a bottom surface of the shell. Further noise reduction is obtained by use of the sound reducing material.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
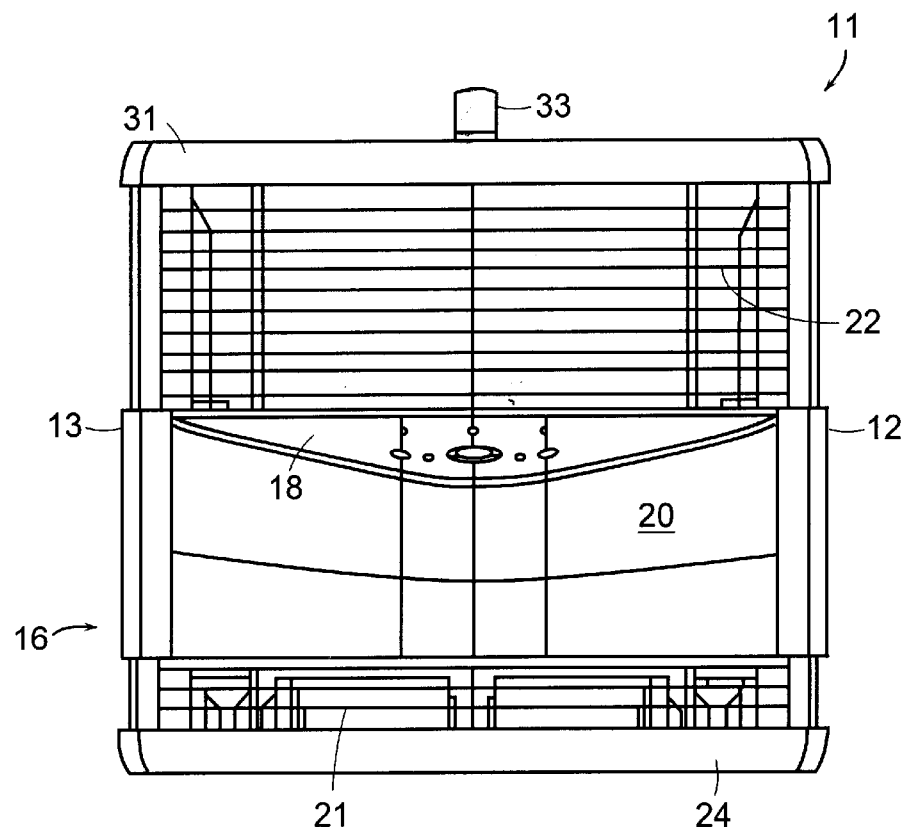
FIG. 1 is a front elevational view of an air cleaner.
Figure 2:
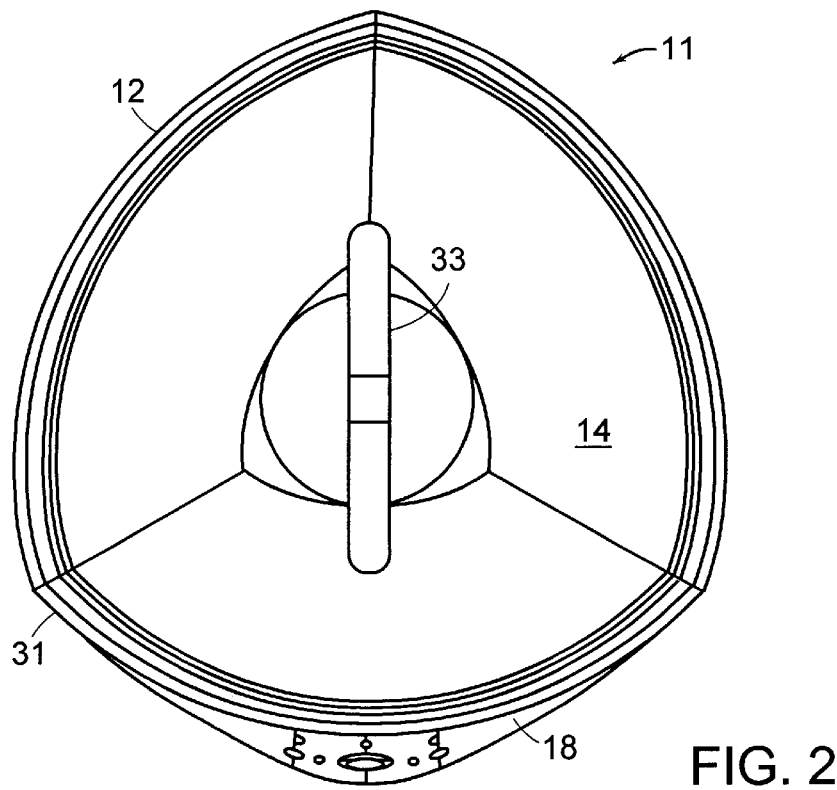
FIG. 2 is a top view of the air cleaner shown in FIG. 1.
Figure 3:
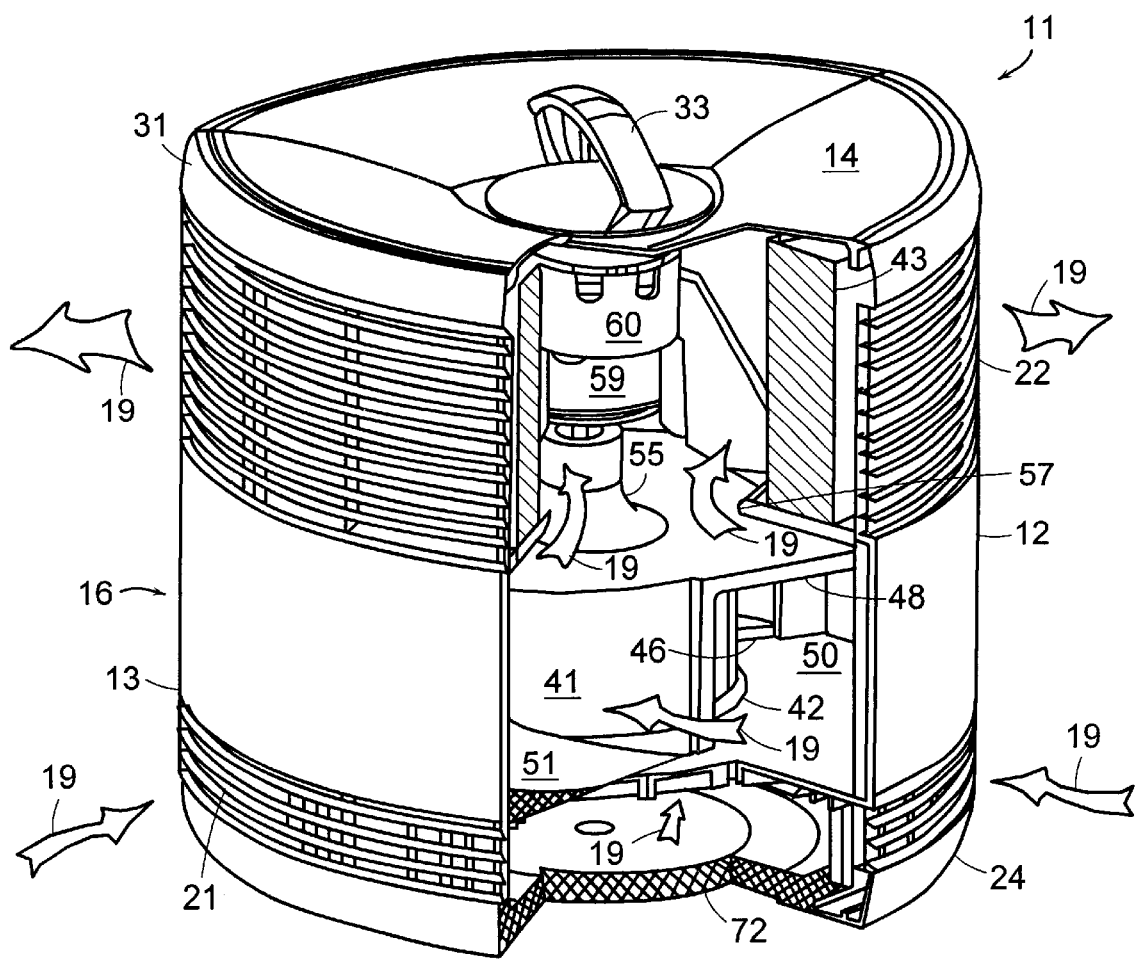
FIG. 3 is a cut-a-way perspective view of the air cleaner shown in FIGS. 1 and 2.

An air cleaner 11 includes a portable housing 12 illustrated in FIGS. 1–3. Included in the housing 12 is a hollow shell 12 having a top wall 14, a bottom wall 15 and a side wall portion 16. A lower portion of the side wall 16 retains an annular first grill work 21 which functions as an air inlet. Providing an air outlet is an annular second grill work 22 retained by an upper portion of the side wall 16. A control panel 18 is mounted on an intermediate portion 20 of the side wall 16. As described hereinafter, an air flow path 19 (FIG. 3) is formed within the housing 11 between the air inlet 21 and air outlet 22.

Figure 4:
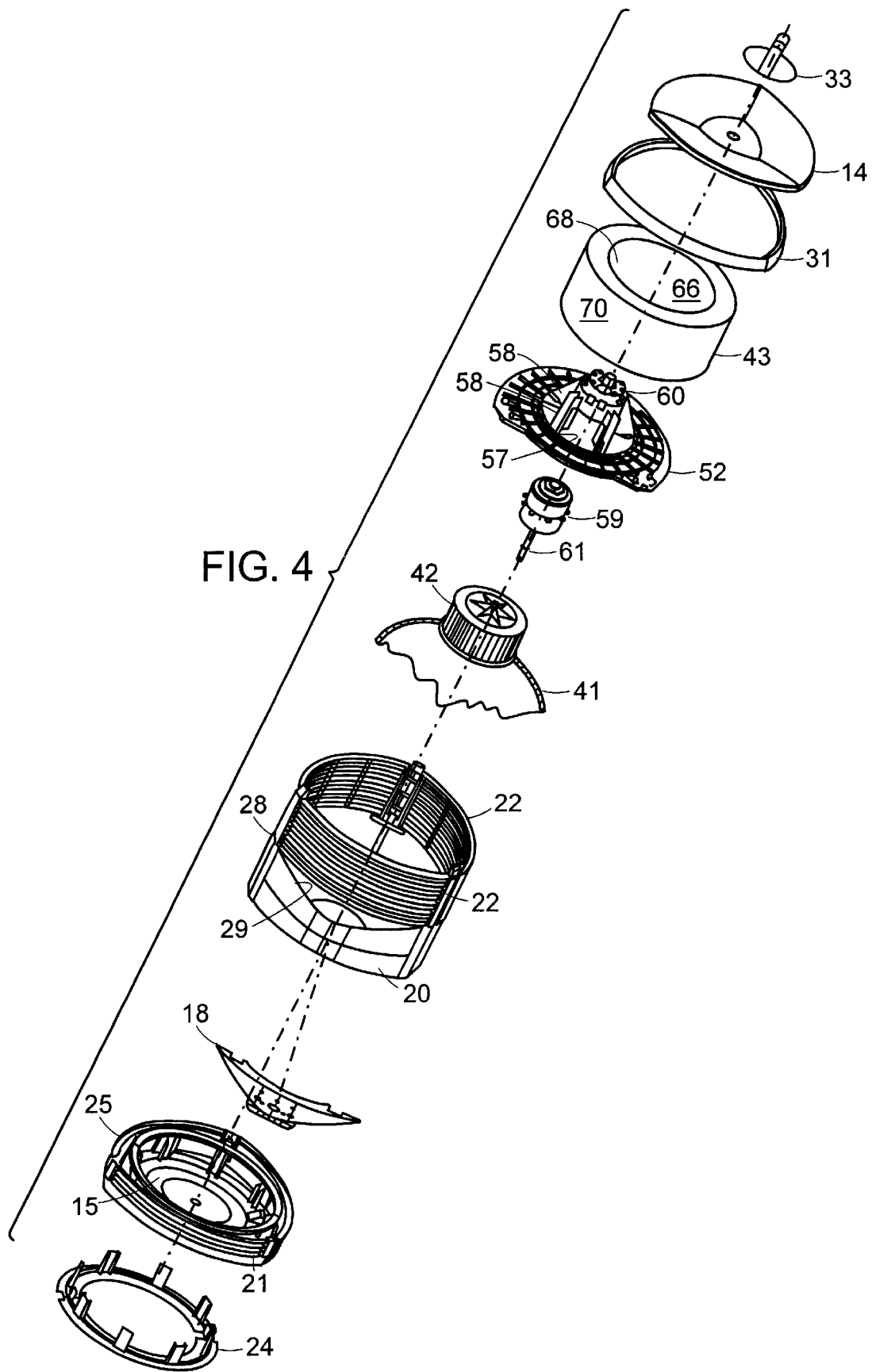
FIG. 4 is an exploded view of the air cleaner shown in FIGS. 1–3.

As shown in FIG. 4, an annular base 24 of the housing 12 supports a member 25 forming the bottom wall 15 and the inlet grill work 21. Supported above the member 25 and aligned therewith is another member 28 forming the annular outlet grill work 22 and the intermediate portion 20 of the shell 13. An opening 29 in the intermediate portion 20 is covered by the control plate 18. Supported on an upper edge of the member 28 is an annular rim 31 which receives the top wall 14. A combination handle and screw plate 33 engages a center portion of the top wall 14 and secures together the individual components of the air cleaner 11.

Figure 6:
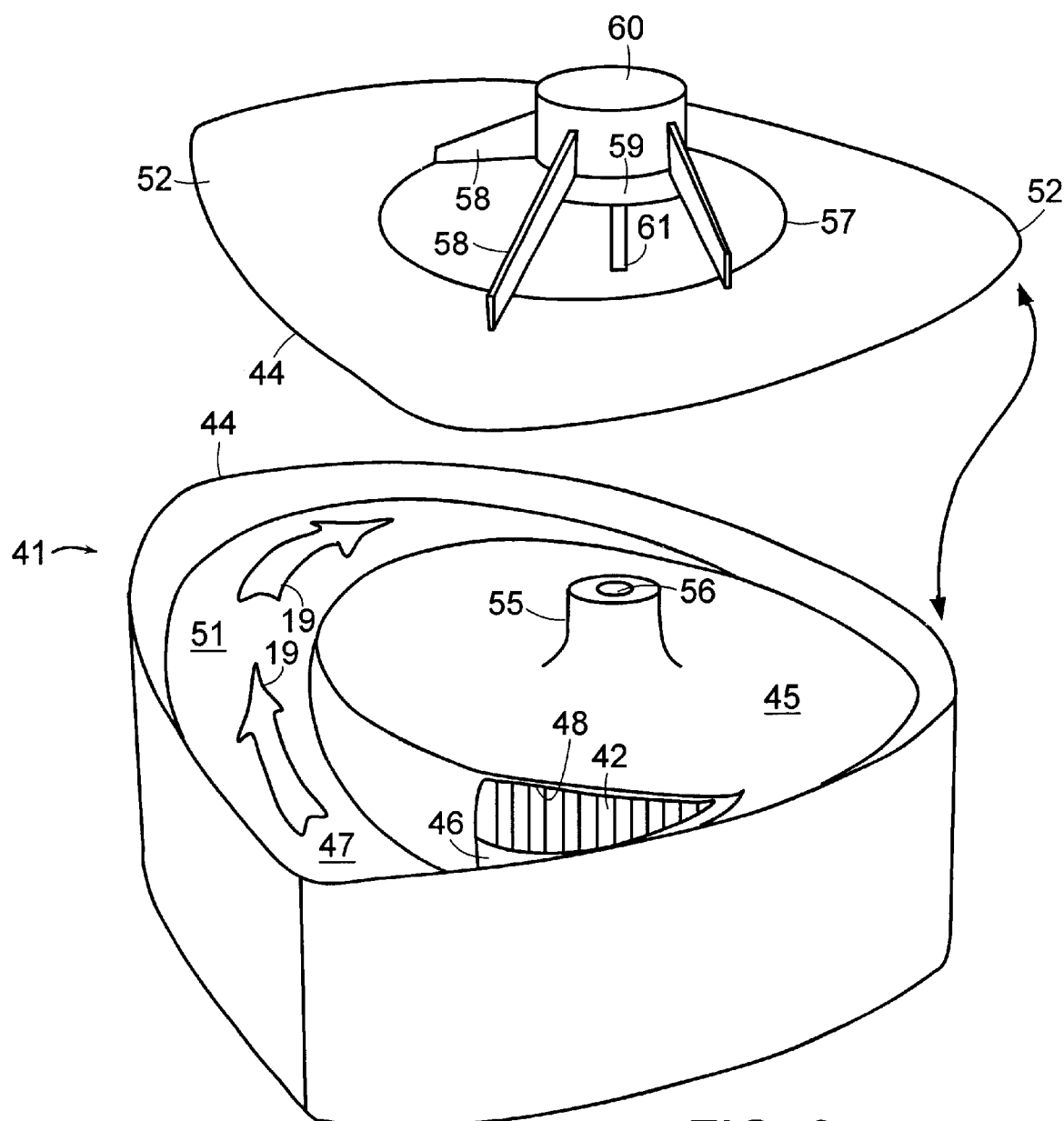
FIG. 6 is a perspective exploded view of an air conveyor member of the air cleaner shown in FIGS. 1–4.
Figure 7:
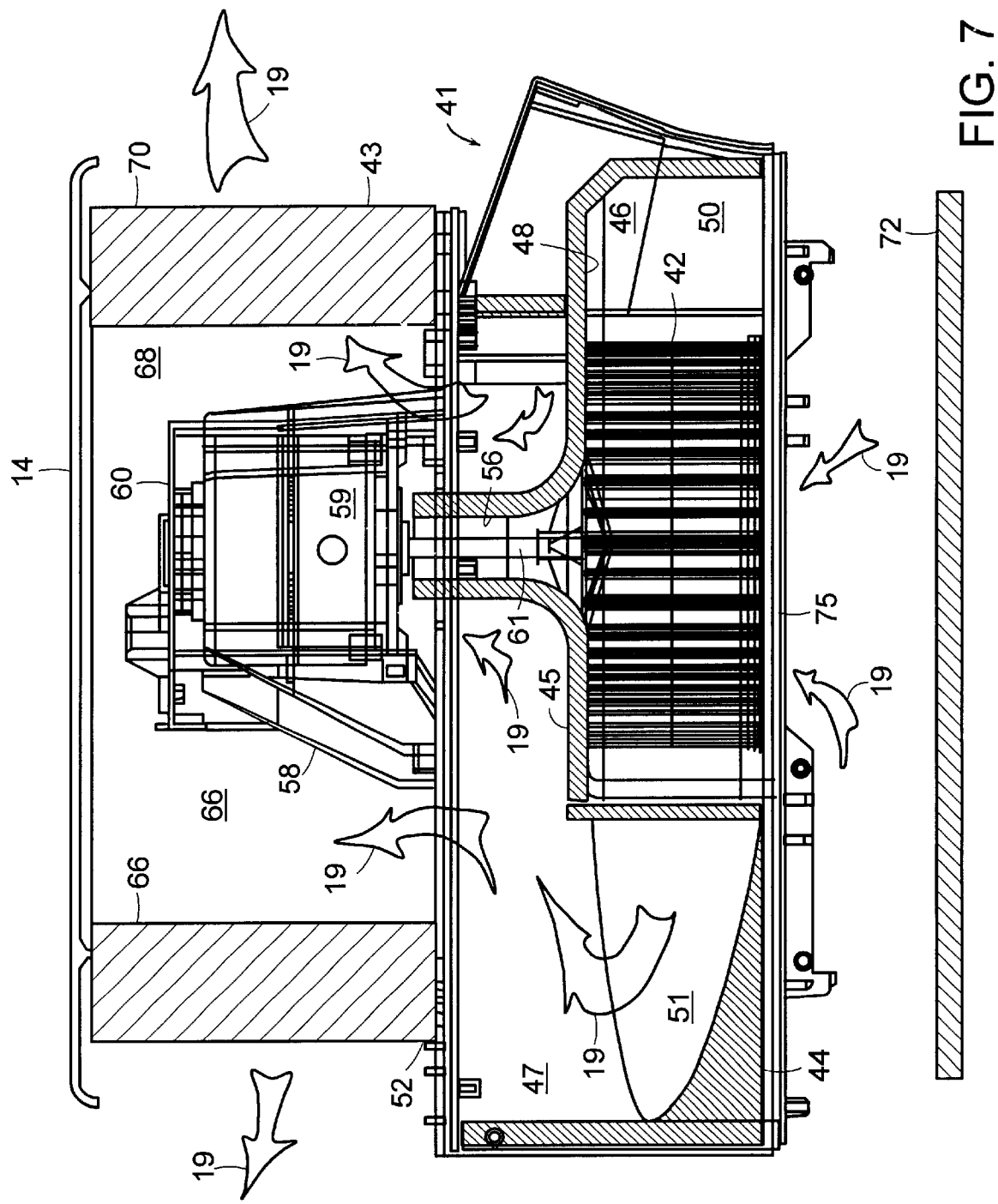
FIG. 7 is a fragmentary cross-sectional view of a portion of the air cleaner shown in FIGS. 1–4.

Retained by the housing 12 in axially upwardly ascending positions are an air conveyor member 41, a centrifugal blower 42 and a hollow cylindrical HEPA filter 43. The air conveyor member 41 is supported above the bottom wall 15 of the shell 13 as shown in FIG. 3. Forming the conveyor 41 is an inner case portion 45 defining a compartment 46 and an outer enclosure 44 defining a scroll shaped air passage 47 having one end 50 communicating with the compartment 46 via an opening 48 in the case portion 45 (FIGS. 6 and 7). A bottom surface 51 of the passage 47 is formed by an upwardly extending ramp and an upper surface is formed by a bottom of an annular plate 52 included in the housing 12. Projecting upwardly from the top of the case portion 45 is a column 55 defining a central orifice 56 which opens into the compartment 46. Struts 58 extend upwardly from a circular opening 57 in the annular plate 52 and support a motor case 60. Retained by the case 60 is an electric motor 59 having a shaft 61 which extends through the opening 56 and engages the centrifugal blower 42 which is rotatably mounted in the compartment 46. An opposite end of the passage 47 is defined by the circular opening 47 in the annular plate 52.

Figure 5:
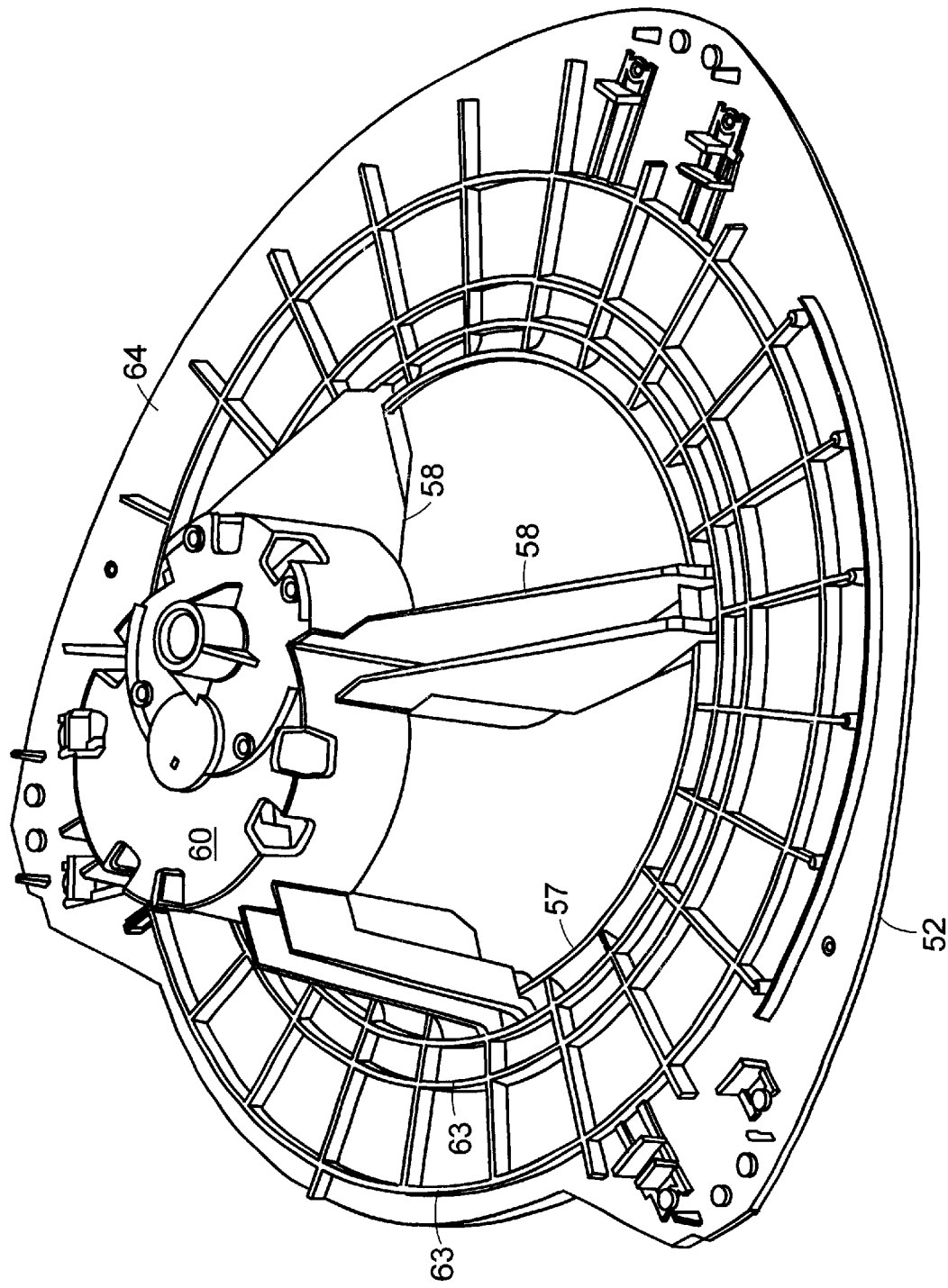
FIG. 5 is a perspective view of one component of the air cleaner shown in FIGS. 1–4.

Annular ribs 63 (FIG. 5) on an upper surface 64 of the annular plate 52 support and seal the bottom surface of the HEPA filter 43. An inner wall surface 66 of the hollow cylindrical filter 43 and an inner surface of the top wall 14 of the shell 13 form a chamber 68 as shown in FIG. 7. The chamber 68 communicates with the circular opening 57 at the opposite end of the scroll shaped passage 47 while an outer wall surface 70 of the HEPA filter 43 communicates with the air outlet 22 via a portion of the air flow path 19 formed within the housing 12. As depicted in FIG. 6, the conveyor member 41 obstructs all rectilinear paths between the blower 42 and the opposite end 57 of the passage 47. The bottom wall 15 of the shell 13 supports a pad 72 made from a suitable sound deadening material and located axially adjacent to an intake opening (FIG. 7) formed in the case portion 45 and aligned with an interior portion of the blower 42.

During operation of the air cleaner 11, energization of the motor 59 induces rotation of the centrifugal blower 42 which in turn produces air movement in the path 19 including the air inlet 21, the intake opening 75 in the case portion 45 of the conveyor member 41, the outlet opening 48 in the case 45, the air flow passage 47, the chamber 68, the HEPA filter 43 and the air outlet 22. The HEPA filter 43 functions in a conventional manner to remove airborne pollutants that contribute to respiratory problems. During the air circulation, the scroll shaped passageway 47 allows cyclonic air expansion and obstructs all rectilinear paths between the blower 42 and the opposite end opening 57 thereby masking the inherent whine produced at the cutoff point of conventional scroll design outlets. In addition, the upwardly extending ramp surface 51 produces air movement in a direction having a component extending axially upwardly from the centrifugal blower 42 thereby reducing back pressure and further reducing sound levels generated by the air cleaner 11. Additional sound suppression is provided at the air inlet 21 by the sound deadening pad 72 and at the air outlet 22 by the reduced air exit velocity provided by the HEPA filter 43 and the inherent characteristic of its pleated design to convert sound energy into heat.

Obviously, many modifications and variations of the present invention are possible in light of the above teachings. It is to be understood, therefore, that the invention can be practiced otherwise than as specifically described.

What is claimed is:

1. A portable air cleaner having low noise air flow and comprising
    a housing defining an air inlet, an air outlet, and an air flow path between said air inlet and said air outlet;
    a centrifugal blower mounted within said air flow path and operable to draw air through said air inlet;
    a filter mounted within said housing and disposed to transmit air circulating in said air flow path out of said air outlet;
    a conveyor surrounding said blower and defining a scroll shaped passage having one end disposed to receive air from said blower and an opposite end disposed to discharge air into said filter; said conveyor being shaped and arranged to obstruct all rectilinear paths between said blower and said opposite end to thereby provide low noise air flow between the air inlet and air outlet.

2. An air cleaner according to claim 1 wherein said filter is a hollow cylindrical filter axially displaced from said blower and said conveyer, wherein an inner wall surface of said cylindrical filter and said housing define a chamber communicating with said opposite end, and wherein a portion of said air flow path extends between an outer wall surface of said filter and said air outlet.

3. An air cleaner according to claim 2 wherein said conveyor comprises a ramp surface partially defining said passage and arranged to convey air between said one end and said opposite end and in a direction having a component axial to said centrifugal blower.

4. An air cleaner according to claim 3 wherein said opposite end is substantially circular.

5. An air cleaner according to claim 4 wherein said filter is mounted adjacent to said air outlet.

6. An air cleaner according to claim 5 wherein said housing comprises a portable shell having a top wall, bottom wall, and side wall; said air inlet is a first annular grillwork defined in a lower portion of said side wall, and said air outlet is a second annular grillwork defined in an upper portion of said side wall.

7. An air cleaner according to claim 1 including sound insulation means forming a portion of the surface over which air passes between said blower and said air inlet.

8. An air cleaner according to claim 7 wherein said filter is a hollow cylindrical filter axially displaced from said blower and said conveyor, an inner wall surface of said cylindrical filter and said housing defines a chamber communicating with said opposite end, and a portion of said air flow path extends between an outer wall surface of said filter and said air outlet.

9. An air cleaner according to claim 8 wherein said housing comprises a portable shell having a top wall, bottom wall, and side wall; said air inlet is a first annular grillwork defined in a lower portion of said side wall, and said air outlet is a second annular grillwork defined in an upper portion of said side wall.

10. An air cleaner according to claim 9 wherein said blower defines a downwardly directed entrance for air, said shell comprises a bottom wall, and said insulation means is supported on said bottom wall directly adjacent to said entrance.

11. A portable air cleaner having low noise air flow and comprising a housing defining an air inlet, an air outlet, and an air flow path between said air inlet and said air outlet;

a centrifugal blower mounted within said air flow path and operable to draw air through said air inlet;

a filter mounted within said housing and disposed to transmit air circulating in said air flow path out of said air outlet;

a conveyor surrounding said blower and defining a scroll shaped passage having one end disposed to receive air from said blower and an opposite end disposed to discharge air into said filter; and wherein said conveyor comprises a ramp surface partially defining said passage and arranged to convey air between said one end and said opposite end and in a direction having a component axial to said centrifugal blower to thereby provide low noise air flow between the air inlet and air outlet.

12. An air cleaner according to claim 11 wherein said filter is a hollow cylindrical filter axially displaced from said blower and said conveyer, wherein an inner wall surface of said cylindrical filter and said housing define a chamber communicating with said opposite end, and wherein a portion of said air flow path extends between an outer wall surface of said filter and said air outlet.

13. An air cleaner according to claim 12 wherein said opposite end is substantially circular.

14. An air cleaner according to claim 13 wherein said filter is mounted adjacent to said air outlet.

15. An air cleaner according to claim 14 wherein said housing comprises a portable shell having a top wall, bottom wall, and side wall; said air inlet is a first annular grillwork defined in a lower portion of said side wall, and said air outlet is a second annular grillwork defined in an upper portion of said side wall.

16. An air cleaner according to claim 15 including sound insulation means forming a portion of the surface over which air passes between said blower and said air inlet.

17. An air cleaner according to claim 16 wherein said blower defines a downwardly directed entrance for air, said shell comprises a bottom wall, and said insulation means is supported on said bottom wall directly adjacent to said entrance.

* * * * *